(12) United States Patent
Santra et al.

(10) Patent No.: US 11,448,721 B2
(45) Date of Patent: Sep. 20, 2022

(54) IN DEVICE INTERFERENCE MITIGATION USING SENSOR FUSION

(71) Applicant: Infineon Technologies AG, Neubiberg (DE)

(72) Inventors: Avik Santra, Munich (DE); Jagjit Singh Bal, Fremont, CA (US)

(73) Assignee: Infineon Technologies AG, Neubiberg (DE)

( * ) Notice: Subject to any disclaimer, the term of this patent is extended or adjusted under 35 U.S.C. 154(b) by 459 days.

(21) Appl. No.: 16/452,028

(22) Filed: Jun. 25, 2019

(65) Prior Publication Data

US 2020/0408894 A1  Dec. 31, 2020

(51) Int. Cl.
| | |
|---|---|
| *G01S 7/02* | (2006.01) |
| *G01S 7/282* | (2006.01) |
| *G01S 7/285* | (2006.01) |
| *G01S 13/50* | (2006.01) |

(52) U.S. Cl.
CPC .............. *G01S 7/023* (2013.01); *G01S 7/282* (2013.01); *G01S 7/285* (2013.01); *G01S 13/50* (2013.01)

(58) Field of Classification Search
CPC ........ G01S 13/885; G01S 13/56; G01S 13/50; G01S 7/2813; G01S 7/40; G01S 7/285; G01S 7/023; G01S 13/04; G01S 7/292; G01S 13/862; G01S 7/032; G01S 7/352; G01S 13/86; G01S 3/8083; G01S 7/282; G01S 15/50; G01S 7/2928; G01S 13/58;

(Continued)

(56) References Cited

U.S. PATENT DOCUMENTS 5,185,608 A * 2/1993 Pozgay ................. G01S 13/87
                                                   342/17
2007/0001896 A1 * 1/2007 Hellsten ................ G01S 7/023
                                                   342/194

(Continued)

FOREIGN PATENT DOCUMENTS

| DE | 102017205331 A1 | 10/2018 |
| WO | 2013037399 A1 | 3/2013 |
| WO | 2018129294 A1 | 7/2018 |

OTHER PUBLICATIONS

Browniee, J., "A Gentle Introduction to LSTM Autoencoders", Navigation, Nov. 5, 2018, 47 pages.

(Continued)

*Primary Examiner* — Olumide Ajibade Akonai
(74) *Attorney, Agent, or Firm* — Slater Matsil, LLP

(57) ABSTRACT

In an embodiment, a method of interference mitigation in a device that includes a millimeter-wave radar, includes transmitting radar signals with the millimeter-wave radar; receiving reflected radar signals with the millimeter-wave radar, the reflected radar signals corresponding to the transmitted radar signals; generating a first spectrogram based on the reflected radar signals; generating a second spectrogram indicative of movement of a non-target object; generating a compensated radar spectrogram based on the first and second spectrograms to compensate for an influence of the movement of the non-target object in the first spectrogram; and detecting a target or a property of the target based on the compensated radar spectrogram.

25 Claims, 5 Drawing Sheets

(58) Field of Classification Search
CPC ........ G01S 7/021; G01S 7/411; G01S 13/581;
G01S 13/583
See application file for complete search history.

(56) References Cited

U.S. PATENT DOCUMENTS

| | | | |
|---|---|---|---|
| 2016/0003935 A1* | 1/2016 | Stainvas Olshansky | G01S 13/931 342/70 |
| 2016/0341814 A1* | 11/2016 | Nguyen | H04L 25/03305 |
| 2017/0282828 A1* | 10/2017 | Carenza | G01S 7/40 |
| 2018/0083718 A1* | 3/2018 | Ward | H04B 17/336 |
| 2018/0302800 A1* | 10/2018 | O'Shea | G06F 9/4881 |
| 2019/0072670 A1* | 3/2019 | Kawanami | G01S 7/414 |
| 2019/0120932 A1* | 4/2019 | Smith | G06K 9/0057 |
| 2019/0346550 A1* | 11/2019 | Finn | A61B 5/0507 |
| 2020/0194023 A1* | 6/2020 | Tintor | H04R 5/02 |

OTHER PUBLICATIONS

Brownlee, J., "Encoder-Decoder Long Short-Term Memory Networks", Navigation, Aug. 23, 2017, 21 pages.
Onishi, Y. et al., "The Development of Ultra Thin Speakers for Mobile Phones", Proceedings of 20th International Congress Acoustics, ICA 2010, Aug. 23-27, 2010, Sydney, Australia, 8 pages.
Steinbaeck, Josef et al., "Design of a Low-level Radar and Time-of-Flight Sensor Fusion Framework", ResearchGate, Infineon Technologies AG, Aug. 2018, 9 pages.

\* cited by examiner

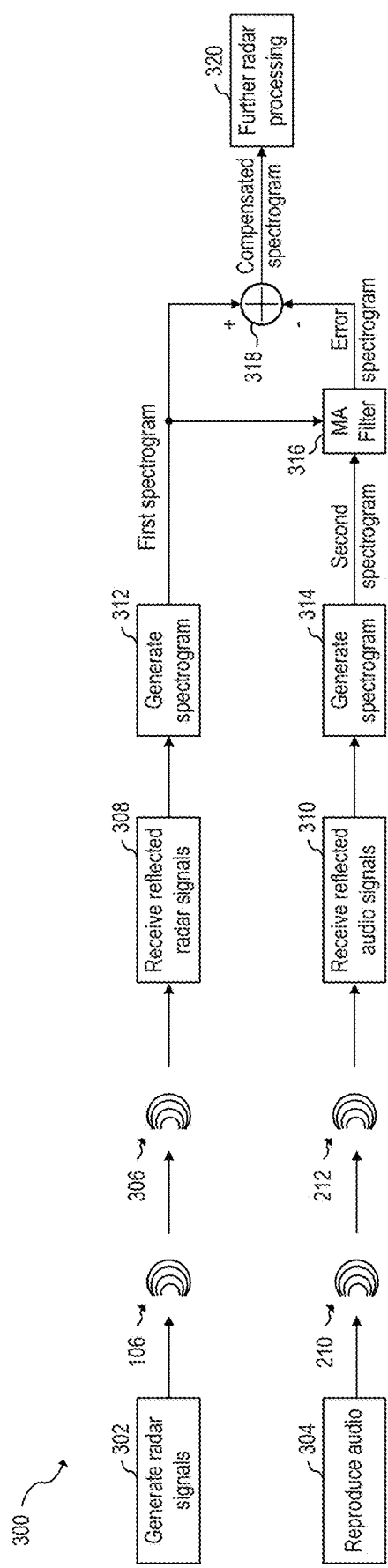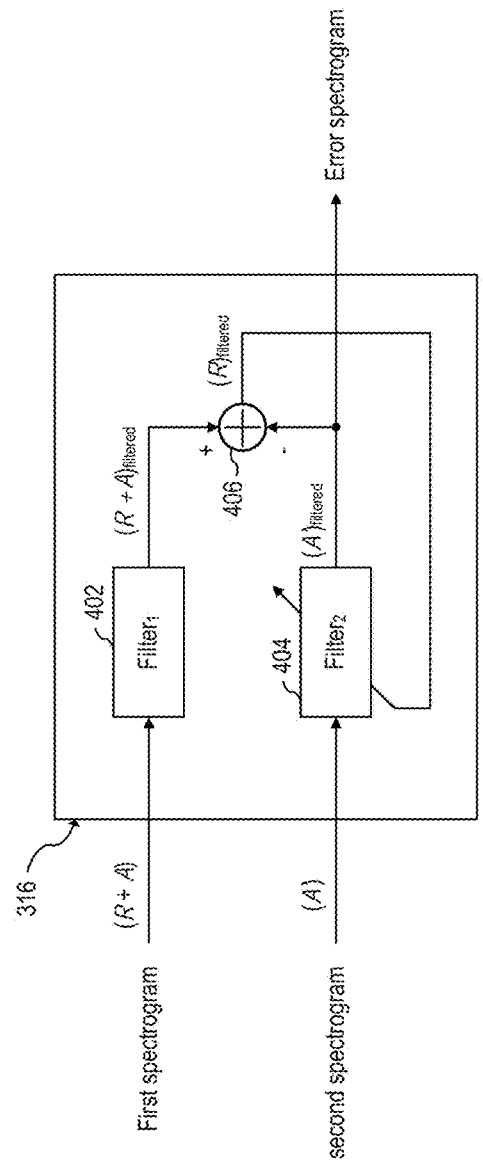

IN DEVICE INTERFERENCE MITIGATION USING SENSOR FUSION

TECHNICAL FIELD

The present disclosure relates generally to an electronic system and method, and, in particular embodiments, to an in device interference mitigation using sensor fusion.

BACKGROUND

Applications in the millimeter-wave (mmWave) frequency regime have gained significant interest in the past few years due to the rapid advancement in low cost semiconductor technologies, such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for millimeter-wave applications at 24 GHz, 60 GHz, 77 GHz, and 80 GHz and also beyond 100 GHz. Such applications include, for example, automotive radar systems and multi-gigabit communication systems.

In some radar systems, the distance between the radar and a target is determined by transmitting a frequency modulated signal, receiving a reflection of the frequency modulated signal (also referred to as the echo), and determining a distance based on a time delay and/or frequency difference between the transmission and reception of the frequency modulated signal. Accordingly, some radar systems include a transmit antenna to transmit the radio-frequency (RF) signal, and a receive antenna to receive the reflected RF signal, as well as the associated RF circuitry used to generate the transmitted signal and to receive the RF signal. In some cases, multiple antennas may be used to implement directional beams using phased array techniques. A multiple-input and multiple-output (MIMO) configuration with multiple chipsets can be used to perform coherent and non-coherent signal processing as well.

SUMMARY

In accordance with an embodiment, a method of interference mitigation in a device that includes a millimeter-wave radar, includes transmitting radar signals with the millimeter-wave radar; receiving reflected radar signals with the millimeter-wave radar, the reflected radar signals corresponding to the transmitted radar signals; generating a first spectrogram based on the reflected radar signals; generating a second spectrogram indicative of movement of a non-target object; generating a compensated radar spectrogram based on the first and second spectrograms to compensate for an influence of the movement of the non-target object in the first spectrogram; and detecting a target or a property of the target based on the compensated radar spectrogram.

In accordance with an embodiment, a device includes: a millimeter-wave radar configured to transmit radar signals and receive reflected radar signals, where the reflected radar signals correspond to the transmitted radar signals; and a controller configured to: generate a first spectrogram based on the reflected radar signals; generate a second spectrogram indicative of movement of a non-target object; generate a compensated radar spectrogram based on the first and second spectrograms to compensate for an influence of the movement of the non-target object in the first spectrogram; and detect a target or a property of the target based on the compensated radar spectrogram.

In accordance with an embodiment, a mobile device includes: a millimeter-wave radar configured to transmit radar signals and receive reflected radar signals, where the reflected radar signals correspond to the transmitted radar signals; a speaker; a microphone configured to measure an output of the speaker to generate a measured output; an enclosure at least partially surrounding the millimeter-wave radar, the speaker and the microphone; and a controller configured to: generate a first spectrogram based on the reflected radar signals; generate a second spectrogram based on the measured output; generate a compensated radar spectrogram based on the first and second spectrograms to compensate for an influence of the movement of the speaker or the enclosure in the first spectrogram; and detect a target or a property of the target based on the compensated radar spectrogram.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 shows flow chart of an embodiment method for compensating radar measurements to mitigate interference, according to an embodiment of the present invention;

FIG. 4 shows the moving average filter of FIG. 3 implemented as an ARMA filter, according to an embodiment of the present invention;

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

Figure 1:
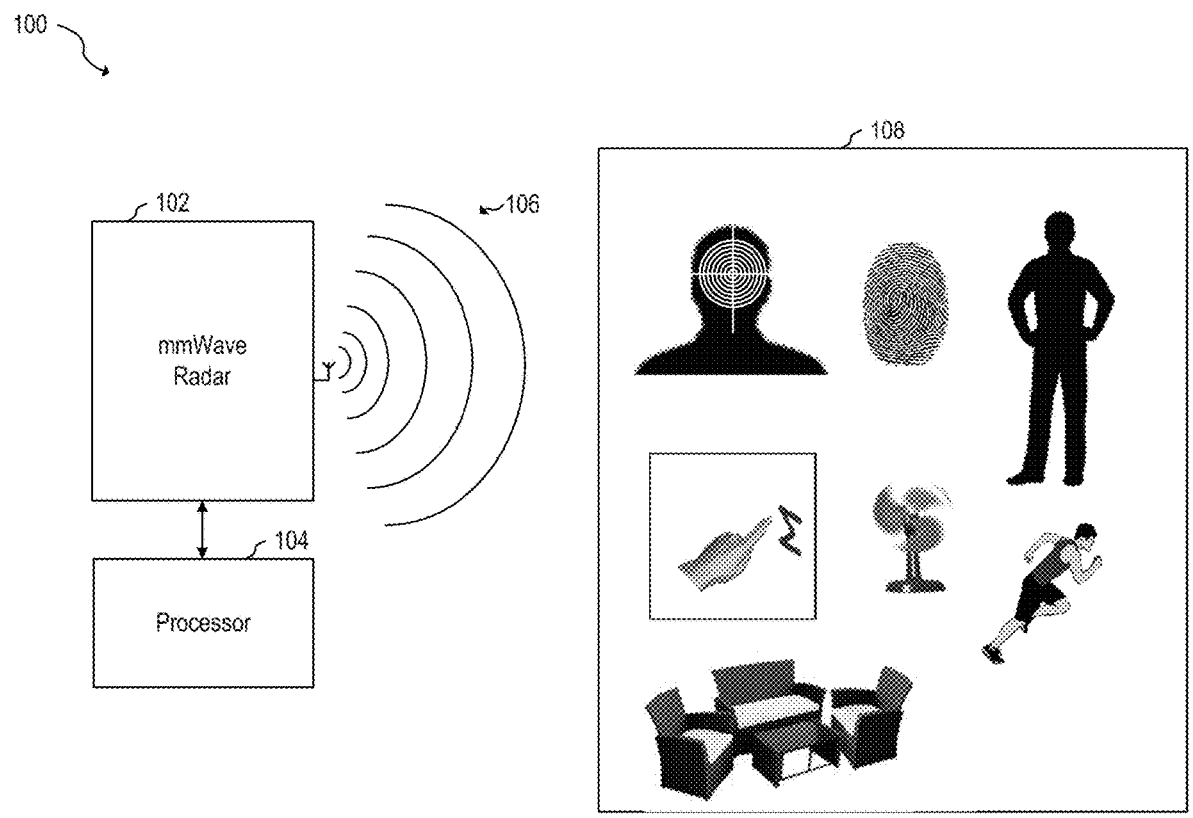
FIG. 1 shows a radar system, according to an embodiment of the present invention.

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, a mobile device having millimeter-wave (mmWave) radar that mitigates interference caused by an actuator of the mobile device using one or more sensors. Embodiments of the present invention may be used in other types of devices, such as computers, sound systems, televisions, voice assistants, etc.

In an embodiment of the present invention, a millimeter-wave radar mitigates interference caused by movement of an object (e.g., a speaker or an enclosure). The millimeter-wave radar transmits radar signals and receives reflected radar signals. A sensor is used to sense a signal indicative of the movement of the object. During the processing of the reflected radar signals, the sensed signal is transformed and subtracted from the reflected radar signals or the processed reflected radar signals to reduce or eliminate the interference. In some embodiments, the millimeter-wave radar generates a first spectrogram based on the reflected radar signals, where the first spectrogram includes an interference component caused by the moving object. The millimeter-wave radar also generates a second spectrogram based on the sensed signals, and then uses the first and second spectrograms (e.g., subtracts the second spectrogram from the first spectrogram) to obtain a compensated spectrogram, where the compensated spectrogram has reduced interference component compared to the first spectrogram. The compensated spectrogram is then used to perform further radar processing, thereby reducing or eliminating false positives.

In some embodiments, the object causing the interference is a non-target object (i.e., an object that the millimeter-wave radar should ignore) in the field-of-view (FoV) of the millimeter-wave radar.

Millimeter-wave radars may be used, for example, to detect moving or static objects in a field of view. For example, FIG. 1 shows millimeter-wave radar system 100, according to an embodiment of the present invention. Millimeter wave radar system 100 includes millimeter-wave radar 102, and processor 104.

During normal operation, millimeter-wave radar 102 transmits radar signals 106, such as plurality of radiation pulses, such as chirps (e.g., linear chirps), towards scene 108. The transmitted radar signals 106 are reflected by objects in scene 108. The reflected radar signals 306 (not shown in FIG. 1), which are also referred to as the echo signal, are detected by millimeter-wave radar 102 and processed by processor 104 to, for example, identify an object, detect an object's location, and/or Doppler velocity and/or trajectory, and other/or determine characteristics of objects in scene 108.

Objects in scene 108 may include static or moving objects. For example, in some embodiments, scene 108 may include one or more of a static person, a moving person, a face of a person, a finger or hand of a person (e.g., making a gesture), a fingerprint, a periodically moving object such as a fan, static objects such as furniture, etc. Other objects may also be included in scene 108.

Millimeter-wave radar 102 operates as a frequency-modulated continuous wave (FMCW) radar or pulsed Doppler radar that includes a millimeter-wave radar sensor circuit, a transmitting antenna(s), and a receiving antenna(s). Millimeter-wave radar 102 transmits and receives signals in the 20 GHz to 122 GHz range. Alternatively, frequencies outside of this range, such as frequencies between 1 GHz and 20 GHz, or frequencies between 122 GHz, and 300 GHz, may also be used.

In some embodiments, the echo signals received by the receiving antennas of millimeter-wave radar 102 are filtered and amplified using band-pass filter (BPFs), low-pass filter (LPFs), mixers, low-noise amplifier (LNAs), and intermediate frequency (IF) amplifiers in ways known in the art by, e.g., millimeter-wave radar 102. The echo signals are then digitized using one or more analog-to-digital converters (ADCs) for further processing, e.g., by processor 104. Other implementations are also possible.

Processor 104 may be implemented as a general purpose processor, controller or digital signal processor (DSP) that includes, for example, combinatorial circuits coupled to a memory. In some embodiments, the DSP may be implemented with an ARM architecture, for example. In some embodiments, processor 104 may be implemented as a custom application specific integrated circuit (ASIC). In some embodiments, processor 104 includes a plurality of processors, each having one or more processing cores. In other embodiments, processor 104 includes a single processor having one or more processing cores. Other implementations are also possible. For example, some embodiments may implement a decoder using software running in a general purpose micro-controller or processor having, for example, a CPU coupled to a memory and implemented with an ARM or x86 architecture. Some embodiments may be implemented as a combination of hardware accelerator and software running on a DSP or general purpose micro-controller.

In some embodiments, processor 104 is integrated inside millimeter-wave radar 102. In other embodiments, processor 104 is external to millimeter-wave radar 102.

Figure 2:
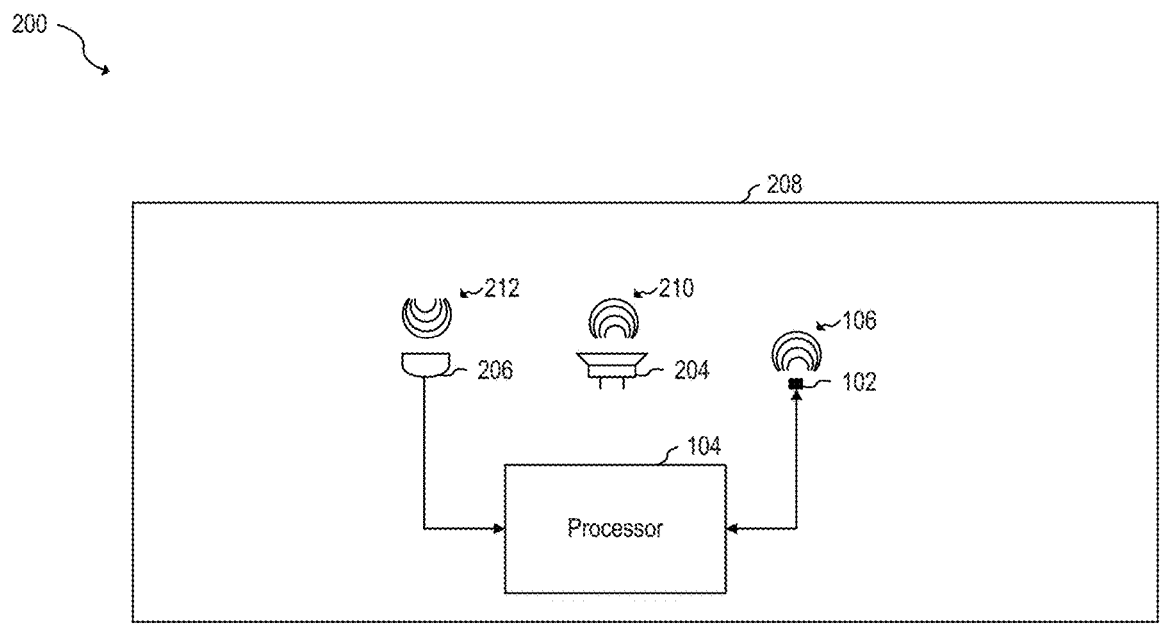
FIG. 2 shows the millimeter-wave radar of FIG. 1 inside an enclosure of an electronic device, according to an embodiment of the present invention.

In some embodiments, millimeter-wave radar 102 may be inside an enclosure, such as inside the enclosure of a smartphone. FIG. 2 shows millimeter-wave radar 102 inside enclosure 208 of electronic device 200, according to an embodiment of the present invention. Electronic device 200 includes speaker 204 and microphone 206.

During normal operation, speaker 204 may reproduce audio, such as a song, a voice of a person talking, a ringtone, etc. To reproduce audio, speaker 204 receives electrical signals corresponding to the audio to be reproduced (not shown). When speaker 204 reproduces audio, a portion of speaker 204, such as the diaphragm, moves to push air, thereby converting the electrical signals received by speaker 204 into sound waves 210.

Speaker 204 may reproduce audio at the same time that millimeter-wave radar 102 is transmitting and receiving radar signals to perform, e.g., object detection, identification, and other radar processing. It is possible that the movement of the portion of speaker 204 (e.g., the movement of the diaphragm) when speaker 204 is reproducing audio is detected by millimeter-wave radar 102 as an object. For example, in some embodiments, speaker 204 is disposed inside the field-of-view of millimeter-wave radar 102. Millimeter-wave radar 102 transmits radar signals 106 that are reflected by the moving diaphragm of speaker 204 (which may be reflected multiple times between the diaphragm of speaker 204 and enclosure 208) and then reach millimeter-wave radar 102. Such received reflected radar signals 306 (not shown in FIG. 2) may cause millimeter-wave radar 102 to detect an object, thereby resulting in an error such as a false positive error.

In an embodiment, microphone 206 is used to receive sound waves 212 (which correspond to sound waves 210) and convert them into received audio electrical signals. The received audio electrical signals may be used to determine the movement of the portion of speaker 204 (e.g., the diaphragm). The determined movement of the portion of speaker 204 may be used to compensate the measurements performed by millimeter-wave radar 102 to avoid false positive errors caused by the movement of the portion of speaker 204.

Electronic device 200 may be, for example, a smartphone or tablet. In some embodiments, electronic device 200 may be smartwatch, laptop, or other mobile device. In some embodiments, electronic device 200 may be a desktop computer, television, voice assistants, sound system, or any other device that includes a microphone, a speaker, and a millimeter-wave radar.

Speaker 204 may be, for example, a cone speaker (i.e., the diaphragm is cone-shaped.). In some embodiments, speaker 204 may be a piezoelectric speaker. Other types of speakers may also be used. In some embodiments, speaker 204 is inside enclosure 208. In other embodiments, speaker 204 may be outside enclosure 208. For example, in some embodiments, enclosure 208 may be near (e.g., adjacent) to another device that includes speaker 204. For example, a smartphone that includes enclosure 208 is in a room, and an external device (e.g., another smartphone, a woofer, a loudspeaker, etc.) that includes speaker 204 is also in the room and is near (e.g., adjacent) to the smartphone that includes enclosure 208).

Microphone 206 may be, for example, a digital microphone. In some embodiments, an analog microphone is used.

In an embodiment of the present invention, a millimeter-wave radar mitigates interference caused by movement of an object (e.g., a speaker or an enclosure) by using a microphone to sense sound waves indicative of the movement of the object. A first spectrogram is generates based on the reflected signals received by the millimeter-wave radar. The audio signals generated by the microphone are used to generate the second spectrogram, which is then used in combination with the first spectrogram (e.g., subtracted from the first spectrogram) to generate the compensated spectrogram. The interference caused by the moving object are advantageously minimized or eliminated from the compensated spectrogram, thereby advantageously reducing false positives.

FIG. 3 shows flow chart of embodiment method 300 for compensating radar measurements to mitigate interference, according to an embodiment of the present invention. Method 300 may be performed, e.g., by millimeter-wave radar system 100, e.g., inside electronic device 200.

During step 302, millimeter-wave radar 102 transmits radar signals 106, which are reflected in objects in the field of millimeter-wave radar 102 to generate reflected radar signals 306. Objects in the field-of-view of millimeter-wave radar 102 may include enclosure 208, speaker 204, and objects outside enclosure 208, such as a hand, a finger, a face of a person, etc.

During step 308, millimeter-wave radar 102 receives reflected radar signals 306. Reflected radar signals 306 may include radar signals reflected from, e.g., the diaphragm of speaker 204.

During step 312, millimeter-wave radar 102 generates a first spectrogram (e.g., using processor 104) based on reflected radar signals 306 received during step 308. Millimeter-wave radar 102 may generate the first spectrogram by performing an FFT on the reflected radar signals 306 and then performing an absolute function. The first spectrogram may include data associated with the movement of the diaphragm of speaker 204.

During step 304, speaker 204 reproduces audio to produce sound waves 210. During step 310, microphone 206 receives sound waves 212, where the sound waves 212 correspond to sound waves 210. For example, in some embodiments, sound waves 210 are reflected in enclosure 208 to generate sound waves 212. In some embodiments, microphone 206 receives sound waves 212 directly from speaker 204 and without being reflected in enclosure 208.

During step 314, millimeter-wave radar 102 generates a second spectrogram (e.g., using processor 104) based on sound waves 212 received during step 310. Millimeter-wave radar 102 may generate the second spectrogram by performing an FFT on the sound waves 212 and then performing an absolute function.

During step 316, a moving average (MA) filter, such as an auto-regressive (AR) MA (ARMA) filter, is used to generate an error spectrogram based on the first and second spectrogram (an example implementation of step 316 is shown in FIG. 4, according to an embodiment of the present invention). The error spectrogram is subtracted from the first spectrogram during step 318 to generate a compensated spectrogram. The compensated spectrogram minimizes or eliminates data associated with, e.g., the movement of the diaphragm of speaker 204, thereby mitigating any interference, e.g., caused by speaker 204 reproducing audio.

During step 320, millimeter-wave radar 102 performs further radar processing based on the compensated spectrogram. The further radar processing may include detecting a target, (e.g., by comparing peaks of the compensated spectrogram with a threshold), as well as determining a property of a target, such as the target's Doppler velocity, material, shape, etc.

Using an ARMA filter based on signals measured by a sensor, such as a microphone, to predict the interference caused by an actuator (such as a speaker as described above in an exemplary manner) or other object (such as an enclosure) advantageously allows the millimeter-wave radar to mitigate the interference despite any non-linearities of the electronic device, and despite any manufacturing variations that the electronic device may exhibit.

In some embodiments, such as when the electronic device is a smartphone or tablet, the electronic device may already include microphones for, e.g., noise cancellation. The same microphones may be used for radar interference mitigation, thereby allowing to achieve better radar performance without adding additional sensors.

FIG. 4 shows moving average filter 316 implemented as an ARMA filter, according to an embodiment of the present invention. Moving average filter 316 includes filters 402 and 404, and summation module 406. Moving average filter 316 aims to reduce the power of the error generated at the output of summation module 406 by adjusting the coefficients of filter 404.

As shown in FIG. 4, the first spectrogram includes radar data A associated with the movement of speaker 204, and radar data R associated with other objects (e.g., different than speaker 204) that are in the field of view of millimeter-wave radar 102. The second spectrogram includes data A' (e.g., captured by microphone 206) associated with the movement of speaker 204. Data A' is similar but not necessary equal to data A. The differences between data A' and data A may be, for example, due to the linearity of the transfer function of microphone, the path that the sound waves 210 took to reach microphone 206, the path that the radiation signals 106 took to reach back millimeter-wave radar 102, etc.

During normal operation, filter 402 receives the first spectrogram and generates a filtered version of the first spectrogram. Filter 404 receives the second spectrogram and generates a filtered version of the second spectrogram. As shown in FIG. 4, in order for the power of the error at the output of summation module 406 to be minimized, the coefficients of filter 404 are modified such that filter 404 generates from the second spectrogram a filtered version ($A'_{filtered}$) that is substantially similar to (and ideally equal to) the filtered radar data ($A_{filtered}$). The output of filter 404 is the error spectrogram used during step 318 to generate the compensated spectrogram.

In some embodiments, filter 316 uses algorithms such as steepest decent to minimize the power of the error at the output of summation module 406. Other algorithms may also be used.

Filters 402 and 404 may be implemented, for example, as finite impulse response (FIR) filters. Summation module 406 may be implemented as a digital block that performs the subtraction of the outputs of filter 404 from filter 402. Other implementations are also possible.

Figure 5:
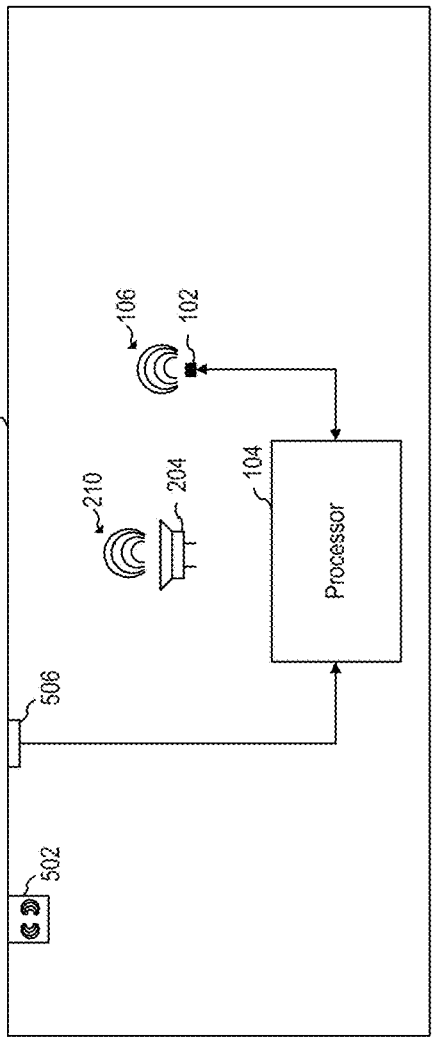
FIG. 5 shows an electronic device, according to an embodiment of the present invention.

In some embodiments, sensors other than a microphone may be used to mitigate interference caused by one or more actuators of the mobile device. For example, FIG. 5 shows electronic device 500, according to an embodiment of the present invention. Electronic device 500 may operate in a similar manner as electronic device 200. Electronic device 500, however, includes haptic actuator 502 and accelerometer 506.

During normal operation, sound waves 210 may cause enclosure 508 to vibrate. For example, the low frequencies of sound waves 210 (e.g., from 100 Hz to 1 kHz) may cause enclosure 508 to vibrate. Similarly, haptic actuator 502, which may vibrate at frequencies from 80 Hz to 500 Hz, may cause enclosure 508 to vibrate.

Enclosure 508 may vibrate at the same time that millimeter-wave radar 102 is transmitting and receiving radar signals to perform, e.g., object detection, identification, and other radar processing. It is possible that the vibration of enclosure 508 is detected by millimeter-wave radar 102 as an object. For example, in some embodiments, millimeter-wave radar 102 transmits radar signals 106 that are reflected by enclosure 508 and then reach millimeter-wave radar 102. Such received reflected radar signals 306 (not shown in FIG. 5) may cause millimeter-wave radar 102 to detect an object, thereby resulting in a false positive error.

In an embodiment, accelerometer 506 is used to measure vibrations of enclosure 508. The measured vibrations may be used to determine the movement of enclosure 508. The determined movement of enclosure 508 may be used to compensate the measurements performed by millimeter-wave radar 102 to avoid false positive errors caused by the movement of enclosure 508.

Haptic actuator 502 may be implemented in any way known in the art. For example, in some embodiments, the haptic actuator is of the eccentric rotating mass (ERM) type. In other embodiments, haptic actuator 502 is of the linear resonant actuator (LRA) type. Other haptic actuator implementations, such as haptic actuators of the piezoelectric type, and of the brushless DC motor (BLDC) type are also possible.

Accelerometer 506 may be implemented in any way known in the art. For example, in some embodiments, accelerometer may be attached to enclosure 508. In other embodiments, accelerometer 506 may be attached onto a surface that is mechanically coupled to enclosure 508 and vibrates along enclosure 508. Other implementations are also possible.

In some embodiments, accelerometer 506 measures vibrations in the y-axis only and passes the measurements onto processor 104 for further processing. In other embodiments, vibrations in other directions, such as along the x axis and/or the z axis are also passed along onto processor 104 for further processing.

Figure 6:
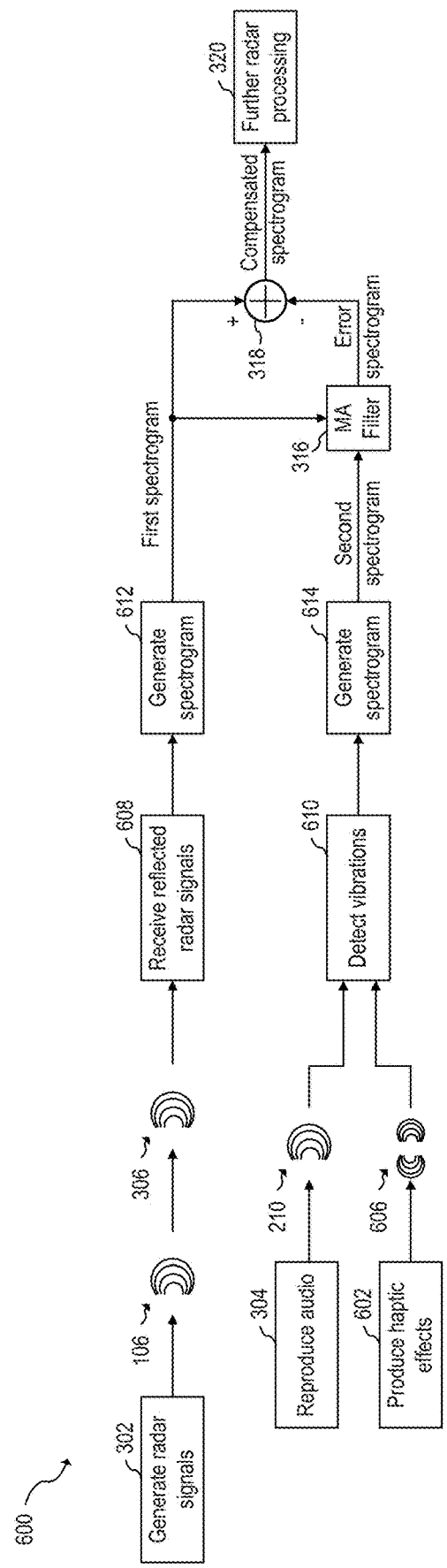
FIG. 6 shows flow chart of an embodiment method for compensating radar measurements to mitigate interference, according to an embodiment of the present invention.

FIG. 6 shows flow chart of embodiment method 600 for compensating radar measurements to mitigate interference, according to an embodiment of the present invention. Method 600 may be performed, e.g., by millimeter-wave radar system 100, e.g., inside electronic device 500. Steps 302, 304, 316, 318, and 320 are described above with respect to FIG. 3.

During step 608, millimeter-wave radar 102 receives reflected radar signals 306. Reflected radar signals 306 may include radar signals reflected from, e.g., enclosure 508.

During step 612, millimeter-wave radar 102 generates a first spectrogram (e.g., using processor 104) based on reflected radar signals 306 received during step 608. Millimeter-wave radar 102 may generate the first spectrogram by performing an FFT on the reflected radar signals 306 and then performing an absolute function. The first spectrogram may include data associated with the movement of enclosure 508.

During step 304, speaker 204 may reproduce audio to produce sound waves 210, which may produce vibrations of enclosure 508. During step 602, haptic actuator 502 may reproduce haptic effects 606, which produce vibration of enclosure 508.

During step 610, accelerometer 506 measures vibration of enclosure 508. Such vibration measurements are used by millimeter-wave radar 102 during step 614 to generate a second spectrogram (e.g., using processor 104). Millimeter-wave radar 102 may generate the second spectrogram by performing an FFT on the measured vibrations and then performing an absolute function.

Step 316, 318 and 320 are performed, e.g., as described with respect to FIG. 3 to generate a compensated spectrogram and perform further radar processing.

Figure 7:
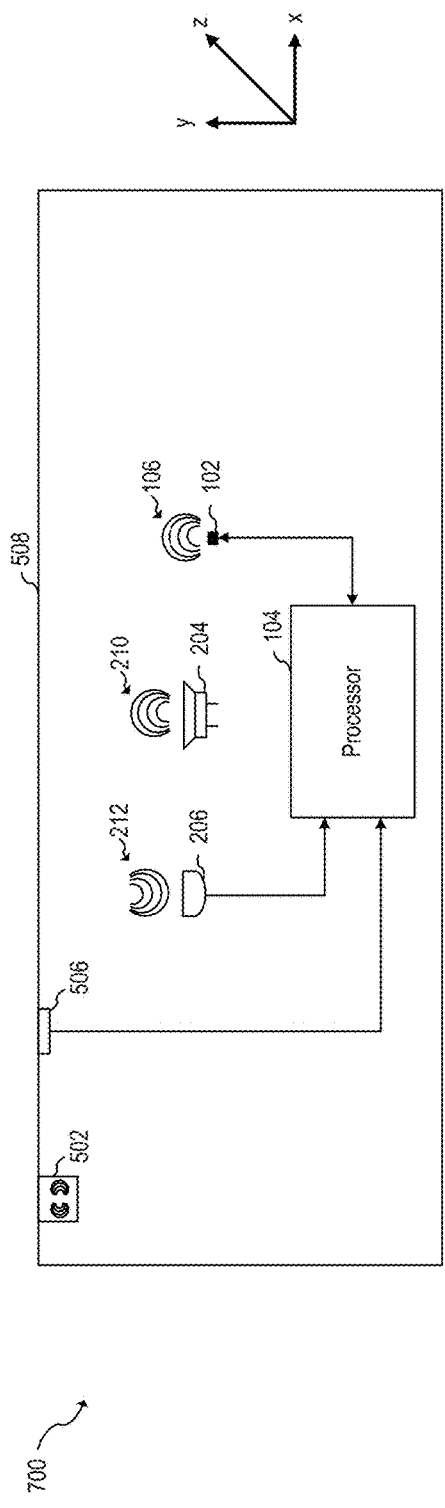
FIG. 7 shows an electronic device, according to an embodiment of the present invention.

In some embodiments, interference from more than one source may be mitigated. For example, FIG. 7 shows electronic device 700, according to an embodiment of the present invention. Electronic device 700 includes speaker 204, microphone 206, haptic actuator 502 and accelerometer 506.

Figure 8:
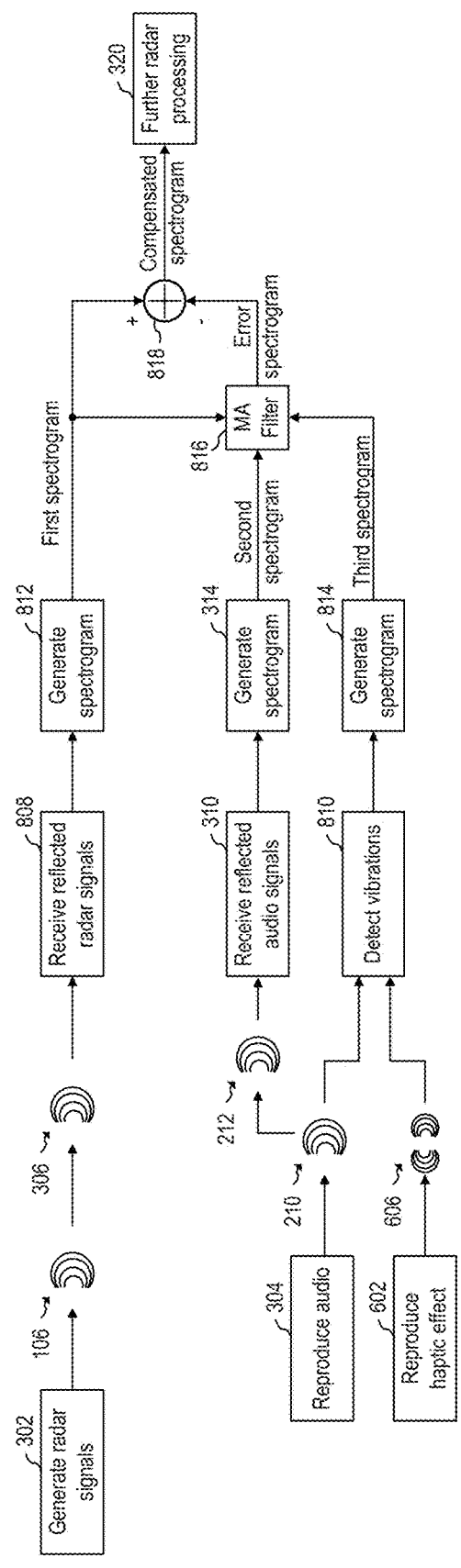
FIG. 8 shows flow chart of an embodiment method for compensating radar measurements to mitigate interference, according to an embodiment of the present invention.

FIG. 8 shows flow chart of embodiment method 800 for compensating radar measurements to mitigate interference, according to an embodiment of the present invention. Method 800 may be performed, e.g., by millimeter-wave radar system 100, e.g., inside electronic device 700. Steps 302, 304, 310, 320, 602, and 614 are described above with respect to FIGS. 3 and 6.

During step 808, millimeter-wave radar 102 receives reflected radar signals 306. Reflected radar signals 306 may include radar signals reflected from, e.g., enclosure 508 and/or from the diaphragm of speaker 204.

During step 812, millimeter-wave radar 102 generates a first spectrogram (e.g., using processor 104) based on reflected radar signals 306 received during step 808. Millimeter-wave radar 102 may generate the first spectrogram by performing an FFT on the reflected radar signals 306 and then performing an absolute function. The first spectrogram may include data associated with the movement of enclosure 508 and/or the diaphragm of speaker 204.

During step 304, speaker 204 may reproduce audio to produce sound waves 210, which may produce vibrations of enclosure 508. During step 602, haptic actuator 502 may reproduce haptic effects 606, which produce vibration of enclosure 508.

During step 810, accelerometer 506 and/or microphone 206 measures vibration of enclosure 508 (microphone 206 may capture vibrations in some embodiments because such vibrations may produce sound in the audible range). Such sound waves and vibration measurements are used by millimeter-wave radar 102 during steps 314 and 814 to generate second and third spectrograms, respectively (e.g., using processor 104).

During step 816, an MA filter, such as an ARMA filter, is used to generate an error spectrogram based on the second and third spectrograms. The error spectrogram is subtracted from the first spectrogram during step 818 to generate a compensated spectrogram. The compensated spectrogram minimizes or eliminates data associated with the movement of the diaphragm of speaker 204 and/or with the movement of enclosure 508, thereby mitigating any interference caused by speaker 204 reproducing audio and/or by vibrations of enclosure 508.

Step 320 is performed, e.g., as described with respect to FIG. 3 to perform further radar processing.

In some embodiments, such as when the electronic device is a smartphone or tablet, the electronic device may already include microphones for, e.g., noise cancellation and an accelerometer. The same microphones and accelerometer may be used for radar interference mitigation, thereby allowing achieving better radar performance without adding additional sensors.

Figure 9:
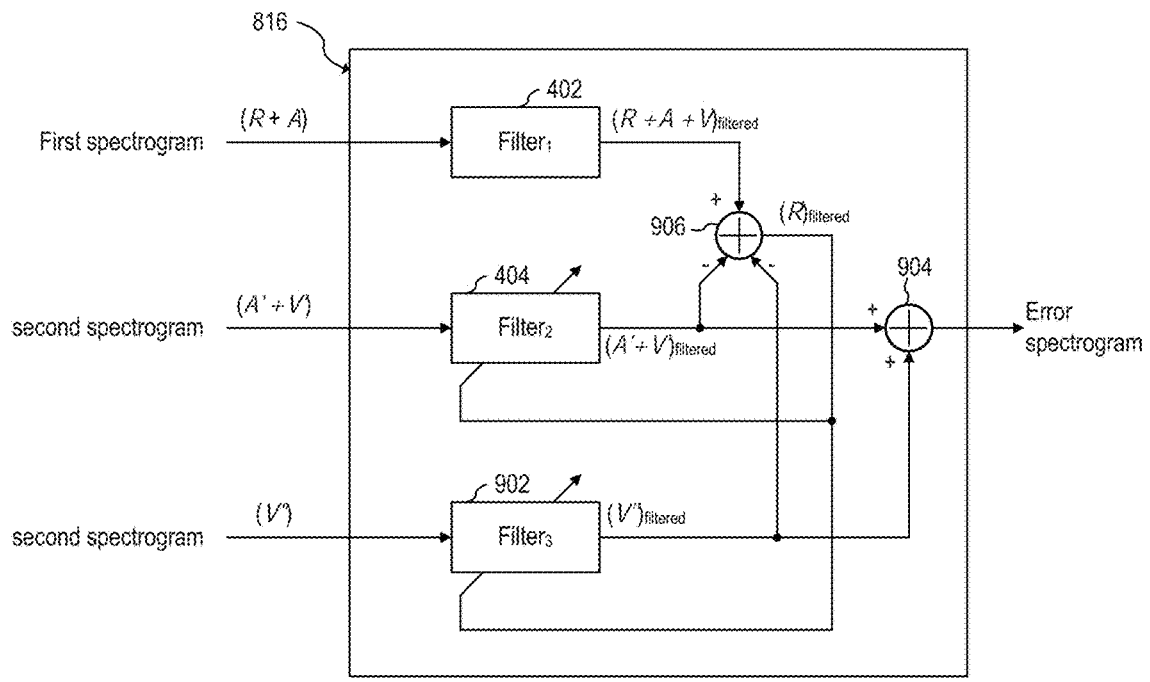
FIG. 9 shows the moving average filter of FIG. 8 implemented as an ARMA filter, according to an embodiment of the present invention.

FIG. 9 shows moving average filter 816 implemented as an ARMA filter, according to an embodiment of the present invention. Moving average filter 816 includes filters 402, 404, and 902, and summation modules 406 and 904. Moving average filter 816 aims to reduce the power of the error generates at the output of summation module 906 by adjusting the coefficients of filters 404 and 902.

As shown in FIG. 9, the first spectrogram includes radar data A associated with the movement of speaker 204, radar data V associated with the movement of enclosure 508, and radar data R associated with other objects (e.g., different than speaker 204 and enclosure 508) that are in the field of view of millimeter-wave radar 102. The second spectrogram includes data A' (e.g., captured by microphone 206) associated with the movement of speaker 204. Data A' is similar but not necessary equal to data A. In some embodiments, the second spectrogram may also include data V' associated with the movement of enclosure 508 (since some vibrations may occur in the audible range). The differences between data A' and data A and between data V' and V, may be, for example, due to the linearity of the transfer function of microphone, the path that the sound waves 210 took to reach microphone 206, the path that the radiation signals 106 took to reach back millimeter-wave radar 102, etc.

The third spectrogram includes data V' (e.g., captured by accelerometer 506) associated with the movement of enclosure 508. Data V' is similar but not necessary equal to data V. The differences between data V" and data V may be, for example, due to the linearity of the transfer function of the accelerometer, the path that the radiation signals 106 took to reach back millimeter-wave radar 102, etc.

During normal operation, filters 402, 404, and 902 receive the first, second, and third spectrograms, respectively, and respectively generate a filtered version of the first, second, and third spectrograms. As shown in FIG. 4, in order for the power of the error at the output of summation module 406 to be minimized, the coefficients of filters 404 and 902 are modified such that $R_{filtered} + A_{filtered} + V_{filtered} - A'_{filtered} - V'_{filtered} - V''_{filtered}$ is equal to $R_{filtered}$. Summation module 904 adds the outputs of filters 404 and 902 to generate the error spectrogram used during step 818 to generate the compensated spectrogram.

In some embodiments, filter 816 uses algorithms such as steepest decent to minimize the power of the error at the output of summation module 906. Other algorithms may also be used.

Filters 402, 404, and 902 may be implemented, for example, as FIR filters. Summation module 904 and 906 may be implemented as a digital block that performs the addition and/or subtractions. Other implementations are also possible.

Figure 10:
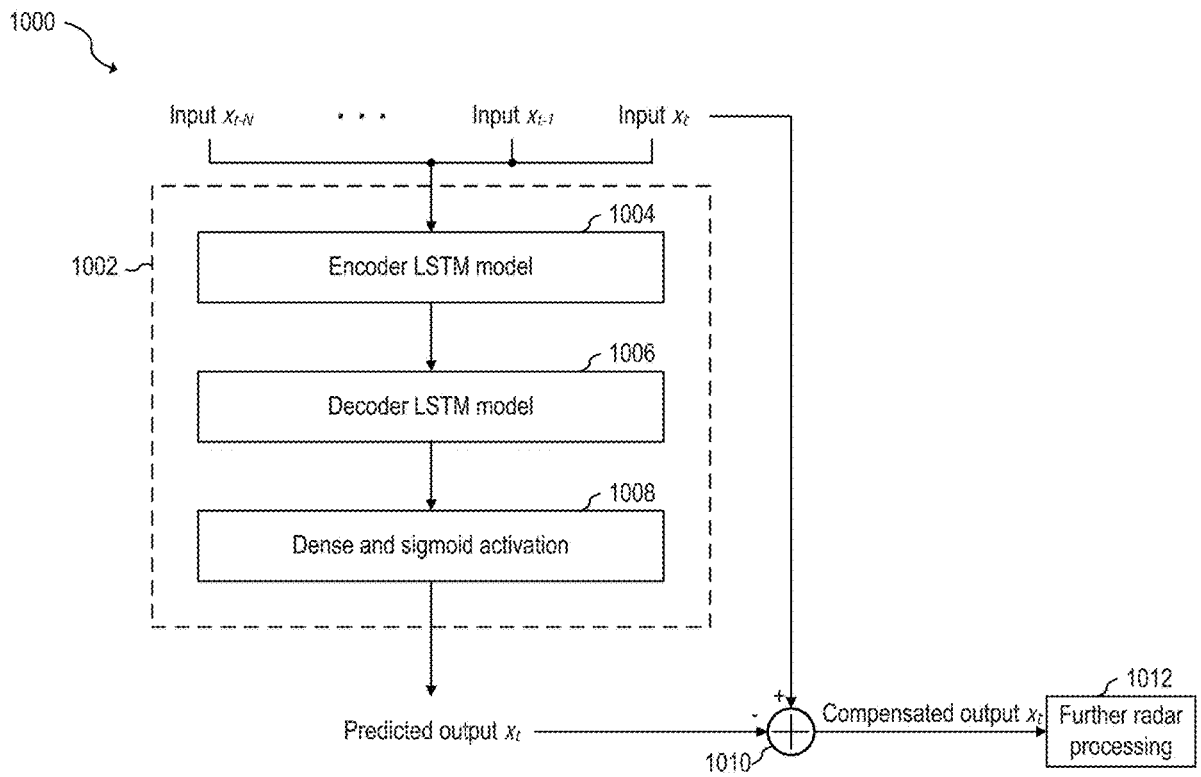
FIG. 10 shows a flow chart of an embodiment method for mitigating interference using a trained forecasting model, according to an embodiment of the present invention.

In some embodiment, the estimate of the interference may be performed by using a predetermined model, such as a pre-trained model. For example, FIG. 10 shows a flow chart of embodiment method 1000 for mitigating interference using trained forecasting model 1002, according to an embodiment of the present invention. Method 1000 may be performed, e.g., by millimeter-wave radar system 100, e.g., inside electronic device 200, 700 or 900.

As shown in FIG. 10, inputs $X_{t-N}$ to $X_t$ are fed to trained forecasting model 1002, where inputs $X_{t-N}$ to $X_t$ include information corresponding to the movement of a non-target object, such as a speaker or enclosure. Forecasting model 1002 then produces a predicted output based on the inputs $X_{t-N}$ to $X_t$. Summation module 1010 subtracts the predicted output $X_t$ from the input $X_t$ to generate a compensated output $X_t$, where the compensated output $X_t$ does not include information corresponding to the movements of the non-target object (or includes a small amount of such information when compared with input $X_t$). The compensated output $X_t$ is then used for further radar processing during step 1012.

In some embodiments, inputs $X_{t-N}$ to $X_t$ are Mel Frequencies Cepstrum Coefficients (MFCC). In such embodiments, output $X_t$ is the time series prediction of the MFCC (at time t). In other embodiments, inputs $X_{t-N}$ to $X_t$ are raw time domain data from millimeter-wave radar 102. In such embodiments, output $X_t$ is the time domain prediction of the next time domain raw data (the predicted value of the raw time domain data at time t). In yet other embodiments, inputs $X_{t-N}$ to $X_t$ are features extracted from a preceding time-distributed convolutional neural network (CNN). In such embodiments, output $X_t$ is the CNN-extracted feature at time t. In yet other embodiments, inputs $X_{t-N}$ to $X_t$ are vectors of a first spectrogram (e.g., where inputs $X_{t-N}$ to $X_t$ together form the first spectrogram), such as the first spectrogram generated in steps 312, 612, or 812, for example. In such embodiments, output $X_t$ is a predicted spectrogram indicative of the movement of a non-target object, such as enclosures 208 (or 508) and/or speaker 204, where speaker 204 may be inside enclosures 208 (or 508), or outside enclosures 208 (or 508).

In some embodiments, trained forecasting model 1002 comprises a long-short term memory network (LSTM) autoencoder that includes encoder LSTM model 1004, decoder LSTM model 1006, and dense and sigmoid activation module 1008. An LSTM autoencoder may be understood as a neural network model that aims to learn a compressed representation of an input in order to recreate the input.

During normal operation, encoder LSTM model 1004 reads inputs $X_{t-N}$ to $X_t$ step by step. After reading the entire sequence of inputs $X_{t-N}$ to $X_t$, encoder LSTM model 1004 produces a fixed-length vector. Decoder LSTM model 1006 receives the fixed-length vector and generates a predicted sequence. Dense and sigmoid activation module 1008 may be used to receive the predicted sequence and recreates the input by applying weights to the predicted sequence. Other LSTM autoencoder implementations known in the art may also be used.

In some embodiments, trained forecasting model 1002 may be trained after a device is assembled. For example, once electronic device 200 is assembled and speaker 204, millimeter-wave radar 102, and microphone 206 are inside enclosure 208, the forecasting model 1002 is trained, e.g., based on known audio received by microphone 206. The known audio may be, e.g., reproduced by speaker 204, where speaker 204 may be inside or outside an enclosure (e.g., 208 or 508) of the device.

In some embodiments, each electronic device (e.g., 200 or 700) that is manufactured undergoes the training of forecasting model 1002. Therefore, each manufactured electronic device may have a different trained forecasting model 1002 since the trained forecasting model 1002 is based on the particular characteristics of, e.g., microphone 206, speaker 204 and enclosure 208, which may vary from electronic device to electronic device. Using a trained forecasting model 1002 advantageously allows for better convergence and accuracy than implementations using, e.g., an ARMA filter.

Example embodiments of the present invention are summarized here. Other embodiments can also be understood from the entirety of the specification and the claims filed herein.

Example 1. A method of interference mitigation in a device including a millimeter-wave radar, the method including: transmitting radar signals with the millimeter-wave radar; receiving reflected radar signals with the millimeter-wave radar, the reflected radar signals corresponding to the transmitted radar signals; generating a first spectrogram based on the reflected radar signals; generating a second spectrogram indicative of movement of a non-target object; generating a compensated radar spectrogram based on the first and second spectrograms to compensate for an influence of the movement of the non-target object in the first spectrogram; and detecting a target or a property of the target based on the compensated radar spectrogram.

Example 2. The method of example 1, where the non-target object includes an actuator, the method further including measuring an output of the actuator with a sensor to generate a measured output, where the second spectrogram is based on the measured output.

Example 3. The method of one of examples 1 or 2, further including activating the actuator, where the device includes the actuator.

Example 4. The method of one of examples 1 or 2, where the actuator is external to the device.

Example 5. The method of one of examples 1 to 4, where the actuator includes a speaker, where the sensor is a microphone, and where the output of the actuator includes sound waves.

Example 6. The method of one of examples 1 to 5, where the non-target object includes an enclosure of the device, the method further including: measuring vibrations of the enclosure of the device with an accelerometer; and generating a third spectrogram based on an output of the accelerometer, where generating the compensated radar spectrogram further includes subtracting the third spectrogram from the first spectrogram.

Example 7. The method of one of examples 1 to 6, where the actuator includes a haptic actuator, and where the sensor is an accelerometer.

Example 8. The method of one of examples 1 to 7, where generating the compensated radar spectrogram includes subtracting the second spectrogram from the first spectrogram.

Example 9. The method of one of examples 1 to 8, where generating the second spectrogram includes using a moving average filter.

Example 10. The method of one of examples 1 to 9, where generating the moving average filter is an autoregressive-moving average (ARMA) filter.

Example 11. The method of one of examples 1 to 8, where generating the second spectrogram includes predicting the second spectrogram based on a model that receives as input data based on the reflected radar signals.

Example 12. The method of one of examples 1 to 8 or 11, where the model is based on neural networks.

Example 13. The method of one of examples 1 to 8 or 11 to 12, where the model is based on a recurrent neural network.

Example 14. The method of one of examples 1 to 8 or 11 to 13, where the model is a long-short term memory (LSTM) recurrent neural network.

Example 15. The method of one of examples 1 to 8 or 11 to 14, further including generating the model by using a training set.

Example 16. A device including: a millimeter-wave radar configured to transmit radar signals and receive reflected radar signals, where the reflected radar signals correspond to the transmitted radar signals; and a controller configured to: generate a first spectrogram based on the reflected radar signals; generate a second spectrogram indicative of movement of a non-target object; generate a compensated radar spectrogram based on the first and second spectrograms to compensate for an influence of the movement of the non-target object in the first spectrogram; and detect a target or a property of the target based on the compensated radar spectrogram.

Example 17. The device of example 16, where the non-target object includes an actuator, the device further including a sensor configured to measure an output of the actuator to generate a measured output, where the controller is configured to generate the second spectrogram based on the measured output.

Example 18. The device of one of examples 16 or 17, further including the actuator.

Example 19. The device of one of examples 16 to 18, further including an enclosure that at least partially surrounds the millimeter-wave radar and the actuator.

Example 20. The device of one of examples 16 to 19, where the enclosure further at least partially surrounds the sensor.

Example 21. The device of one of examples 16 to 20, where generating the compensated radar spectrogram includes subtracting the second spectrogram from the first spectrogram.

Example 22. The device of one of examples 16 to 21, where generating the second spectrogram includes predicting the second spectrogram based on a model that receives as input data based on the reflected radar signals.

Example 23. A mobile device including: a millimeter-wave radar configured to transmit radar signals and receive reflected radar signals, where the reflected radar signals correspond to the transmitted radar signals; a speaker; a microphone configured to measure an output of the speaker to generate a measured output; an enclosure at least partially surrounding the millimeter-wave radar, the speaker and the microphone; and a controller configured to: generate a first spectrogram based on the reflected radar signals; generate a second spectrogram based on the measured output; generate a compensated radar spectrogram based on the first and second spectrograms to compensate for an influence of the movement of the speaker or the enclosure in the first spectrogram; and detect a target or a property of the target based on the compensated radar spectrogram.

Example 24. The mobile device of example 23, where generating the second spectrogram includes using an autoregressive-moving average (ARMA) filter.

Example 25. The mobile device of one of examples 23 or 24, where generating the compensated radar spectrogram includes subtracting the second spectrogram from the first spectrogram.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of interference mitigation in a device comprising a millimeter-wave radar, the method comprising:
   transmitting radar signals with the millimeter-wave radar;
   receiving reflected radar signals with the millimeter-wave radar, the reflected radar signals corresponding to the transmitted radar signals;
   generating a first spectrogram based on the reflected radar signals;
   measuring an output of an actuator with a sensor to generate a measured output;
   generating a second spectrogram indicative of movement of the actuator based on the measured output;
   generating a compensated radar spectrogram based on the first and second spectrograms to compensate for an influence of the movement of the actuator in the first spectrogram; and
   detecting a target or a property of the target based on the compensated radar spectrogram.

2. The method of claim 1, further comprising activating the actuator, wherein the device comprises the actuator.

3. The method of claim 1, wherein the actuator is external to the device.

4. The method of claim 1, wherein the actuator comprises a speaker, wherein the sensor is a microphone, and wherein the output of the actuator comprises sound waves.

5. The method of claim 4, wherein the actuator comprises an enclosure of the device, the method further comprising:
   measuring vibrations of the enclosure of the device with an accelerometer; and
   generating a third spectrogram based on an output of the accelerometer, wherein generating the compensated radar spectrogram further comprises subtracting the third spectrogram from the first spectrogram.

6. The method of claim 1, wherein the actuator comprises a haptic actuator, and wherein the sensor is an accelerometer.

7. The method of claim 1, wherein generating the compensated radar spectrogram comprises subtracting the second spectrogram from the first spectrogram.

8. The method of claim 1, wherein generating the second spectrogram comprises using a moving average filter.

9. The method of claim 8, wherein generating the moving average filter is an autoregressive-moving average (ARMA) filter.

10. The method of claim 1, wherein generating the second spectrogram comprises predicting the second spectrogram based on a model that receives as input data based on the reflected radar signals.

11. The method of claim 10, wherein the model is based on neural networks.

12. The method of claim 10, wherein the model is based on a recurrent neural network.

13. The method of claim 10, wherein the model is a long-short term memory (LSTM) recurrent neural network.

14. The method of claim 10, further comprising generating the model by using a training set.

15. A device comprising:
   a millimeter-wave radar configured to transmit radar signals and receive reflected radar signals, wherein the reflected radar signals correspond to the transmitted radar signals;
   a sensor configured to measure an output of an actuator to generate a measured output; and
   a controller configured to:
      generate a first spectrogram based on the reflected radar signals;
      generate a second spectrogram indicative of movement of the actuator based on the measured output;
      generate a compensated radar spectrogram based on the first and second spectrograms to compensate for an influence of the movement of the actuator in the first spectrogram; and
      detect a target or a property of the target based on the compensated radar spectrogram.

16. The device of claim 15, further comprising the actuator.

17. The device of claim 16, further comprising an enclosure that at least partially surrounds the millimeter-wave radar and the actuator.

18. The device of claim 17, wherein the enclosure further at least partially surrounds the sensor.

19. The device of claim 15, wherein generating the compensated radar spectrogram comprises subtracting the second spectrogram from the first spectrogram.

20. The device of claim 15, wherein generating the second spectrogram comprises predicting the second spectrogram based on a model that receives as input data based on the reflected radar signals.

21. The device of claim 15, further comprising an enclosure, wherein the sensor comprises an accelerometer configured to measure vibrations of the enclosure to generate the measured output.

22. The device of claim 15, wherein the controller is configured to generate the second spectrogram using a long-short term memory (LSTM) recurrent neural network.

23. A mobile device comprising:
a millimeter-wave radar configured to transmit radar signals and receive reflected radar signals, wherein the reflected radar signals correspond to the transmitted radar signals;
a speaker;
a microphone configured to measure an output of the speaker to generate a measured output;
an enclosure at least partially surrounding the millimeter-wave radar, the speaker and the microphone; and
a controller configured to:
generate a first spectrogram based on the reflected radar signals;
generate a second spectrogram based on the measured output;
generate a compensated radar spectrogram based on the first and second spectrograms to compensate for an influence of the movement of the speaker or the enclosure in the first spectrogram; and
detect a target or a property of the target based on the compensated radar spectrogram.

24. The mobile device of claim 23, wherein generating the second spectrogram comprises using an autoregressive-moving average (ARMA) filter.

25. The mobile device of claim 23, wherein generating the compensated radar spectrogram comprises subtracting the second spectrogram from the first spectrogram.

* * * * *